(12) United States Patent
Konanur et al.

(10) Patent No.: US 9,785,261 B2
(45) Date of Patent: Oct. 10, 2017

(54) NEAR FIELD COMMUNICATIONS (NFC)-BASED ACTIVE STYLUS

(71) Applicants: Anand S. Konanur, Sunnyvale, CA (US); Anchit Dixit, Fremont, CA (US); Rohit Mittal, Sunnyvale, CA (US); Shwetank Kumar, San Francisco, CA (US); Ulun Karacaoglu, San Diego, CA (US); Songnan Yang, San Jose, CA (US)

(72) Inventors: Anand S. Konanur, Sunnyvale, CA (US); Anchit Dixit, Fremont, CA (US); Rohit Mittal, Sunnyvale, CA (US); Shwetank Kumar, San Francisco, CA (US); Ulun Karacaoglu, San Diego, CA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 14/576,509

(22) Filed: Dec. 19, 2014

(65) Prior Publication Data
US 2016/0179223 A1  Jun. 23, 2016

(51) Int. Cl.
  *G06F 3/033* (2013.01)
  *G06F 3/0354* (2013.01)
  *H04B 5/00* (2006.01)
  *G06K 9/00* (2006.01)

(52) U.S. Cl.
  CPC ..... *G06F 3/03545* (2013.01); *G06K 9/00087* (2013.01); *H04B 5/0031* (2013.01); *H04B 5/0037* (2013.01)

(58) Field of Classification Search
  CPC .................................................. G06F 3/03545
  USPC ........................................................... 345/179
  See application file for complete search history.

(56) References Cited

U.S. PATENT DOCUMENTS

| | | | |
|---|---|---|---|
| 9,195,879 B1* | 11/2015 | Du | ............ G06K 9/00067 |
| 2012/0309308 A1 | 12/2012 | Kim et al. | |
| 2013/0091238 A1* | 4/2013 | Liu | ............ H04W 76/02 709/217 |
| 2013/0106719 A1 | 5/2013 | Sundara-Rajan et al. | |
| 2013/0181953 A1 | 7/2013 | Hinckley et al. | |
| 2013/0203346 A1 | 8/2013 | Han | |
| 2014/0028635 A1* | 1/2014 | Krah | ............ G06F 3/041 345/179 |
| 2014/0029183 A1* | 1/2014 | Ashcraft | ............ G06F 3/03545 361/679.4 |
| 2014/0092069 A1 | 4/2014 | Bentov | |
| 2014/0256250 A1 | 9/2014 | Cueto et al. | |
| 2015/0205382 A1* | 7/2015 | Lin | ............ G06F 3/0383 345/179 |
| 2016/0063294 A1* | 3/2016 | Du | ............ G06K 9/0002 382/124 |
| 2016/0063300 A1* | 3/2016 | Du | ............ G06K 9/00033 382/124 |

(Continued)

OTHER PUBLICATIONS

Extended European Search report received for European Patent Application No. 15195263.7, mailed on Jan. 15, 2016, 12 pages.

*Primary Examiner* — Jason Olson
(74) *Attorney, Agent, or Firm* — Schiff Hardin LLP (57) ABSTRACT

Described herein are architectures, platforms and methods for NFC-based operations in a stylus device.

22 Claims, 5 Drawing Sheets

(56) References Cited

U.S. PATENT DOCUMENTS

2016/0111892 A1* 4/2016 Joehren .................. H02H 9/041
　　　　　　　　　　　　　　　　　　　　　　361/56
2016/0134738 A1* 5/2016 Liu ....................... H04W 4/008
　　　　　　　　　　　　　　　　　　　　　　455/557

* cited by examiner

NEAR FIELD COMMUNICATIONS (NFC)-BASED ACTIVE STYLUS

BACKGROUND

Portable devices such as tablets, phone and Ultrabook devices that are available in the market support the use of a stylus or a stylus device. For example, among other types of stylus supported is an active stylus, which carries its own power source to power itself. This feature is particularly attractive due to supporting finer stylus tips enabling more natural writing experience, better noise immunity and its ability to add extra functions such as eraser and pressure sensitivity in the stylus.

One problem with the active stylus has been the need to incorporate a battery to accommodate the power needs of the circuitry. The incorporation of the battery (e.g., AA batteries) increases the thickness and weight of the stylus, and affects the balance on the stylus. This is in addition to the need to replace batteries on the stylus periodically.

Thus, an ideal active stylus solution may have the following features: long battery life, which is typically measured in several months with 8 hour usage per day; a light weight and proper distribution of weight to mimic a traditional pen; and an ability to be quickly charged in the event of a discharge without relying on components that are external to the computer system. As such, there is a need for a design to provide the solution as described above.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for an NFC-based active stylus operations. The stylus, for example, is configured as an independent wireless device that is coupled or paired with another device such as a tablet, mobile phone, and other types of portable devices.

In an implementation, the stylus includes a stylus coil antenna that detects presence of a magnetic field when it is aligned or directed to a magnetic field-coverage area of another device (e.g., portable device). The detected magnetic fields, for example, may facilitate switching ON, power charging, and establishing of a near field communication (NFC) link in the stylus.

As an independent wireless device, the stylus further includes a NFC module configured to process a signal that is received through the stylus coil antenna. For example, the received signal includes a particular frequency channel to use for the NFC link. In this example, the particular frequency channel is selected by the main device (i.e., tablet, mobile phone, etc.) and this is transmitted towards the stylus for further processing. For example, with the received particular frequency channel, a stylus processor coupled to the NFC module may run one or more applications to control an operation of the stylus. The operation may include transmitting an information or data using the particular frequency channel. In this manner, the stylus need not transmit multiple frequencies which may be needed to avoid noise and thus, the stylus saves battery power in this configuration while avoiding noise.

The stylus may also include a switch (i.e., user interface) coupled to the processor. For example, the switch is configured to facilitate selection of operations that correspond to the one or more applications. In this example, the stylus processor receives the selection signal and thereafter runs the corresponding application. For example, pressing the switch once triggers the stylus processor to run user-fingerprint identification. In this example, a sensor that is embedded in the stylus performs scanning and reading of the user fingerprint and the scanned fingerprint is thereafter compared with fingerprints stored in the stylus. The verified user-fingerprint may be further transmitted to the other device for electronic signature verification purposes.

In another example, the verification of the user-fingerprint may be used as the basis for an authority to open and/or edit a particular document(s), or vice-versa. That is, the stylus processor is configured to make a user-identification and thereafter limits the particular document/s that may be opened or edited based on the user-identification. Conversely, when the particular document(s) are already opened at the main device, the stylus processor may be configured to use the user-identification in determining user-authority to further edit the opened particular document(s).

In another implementation, the stylus includes a NFC tag that includes a unique identification for the stylus. The NFC tag, for example, is transmitted by the NFC module through the stylus coil antenna to identify the stylus to the other device.

Figure 1:
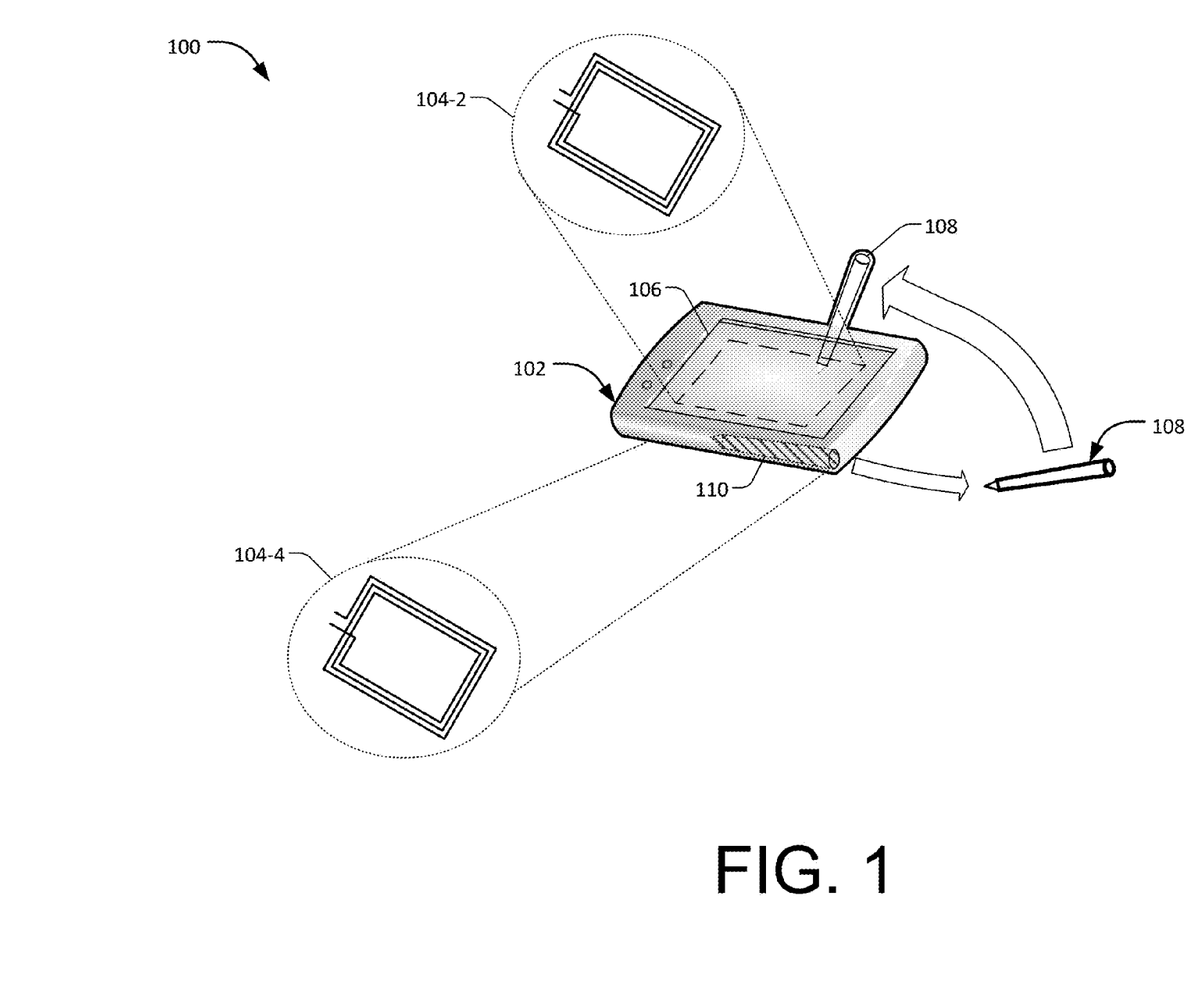
FIG. 1 is an example scenario illustrating a near field communication (NFC)-based stylus and device arrangement as described in implementations herein.

FIG. 1 is an example scenario 100 that illustrates an NFC-based stylus and device arrangement as described in implementations herein. The NFC-based stylus, for example, is an untethered stylus that may or may not use a battery to power itself.

Scenario 100 may include a portable device 102 with a first coil antenna 104-2, a second coil antenna 104-4, and a capacitive-based touch-sensor screen 106. The scenario 100 further shows a stylus 108 and a built-in stylus holder 110 at a back-cover of the portable device 102. The built-in stylus holder 110, for example, may be utilized for charging/docking of the stylus 108 when not in use.

In an implementation, a near field coupling arrangement such as an NFC communication between the stylus 108 and the portable device 102 is integrated or incorporated with features of the touch-sensor screen 106. For example, when the stylus 108 is taken out from the stylus holder 110 and is aligned or directed within a certain distance, which is enough to be within a magnetic field-coverage area of the first coil antenna 104-2, the first coil antenna 104-2 may facilitate power activation in the stylus 108. Furthermore, the first coil antenna 104-2 may initiate NFC-power charging of the stylus 108 using a principle of mutual induction between the first coil antenna 104-2 and an antenna (not shown) of the stylus 108.

In an implementation, a processor (not shown) within the portable device 102 may select a particular frequency channel and this information (i.e., frequency channel) is transmitted through the first coil antenna 104-2 to the stylus 108. The particular frequency channel, for example, may be utilized by the stylus 108 in transmitting data such as a user identity or user-fingerprint data, stylus-status information, stylus location, current battery charging status of the stylus, and the like, to the portable device 102. To obtain this data, the stylus 108 may further include different other sensors such as a fingerprint-sensor, accelerometer, heart-rate sensor, battery status sensor, and the like.

When a tip of the stylus 108 engages the touch-sensor screen 106, the NFC transaction or wireless communication between the stylus 108 and the portable device 102 may still continue. That is, the stylus 108 may still transmit data and the data is received by the portable device 102 through its first coil antenna 104-2. The stylus 108, for example, may include the antenna that is utilized when engaging in an NFC communication or transaction with the portable device 102. Furthermore, the stylus 108 may include software, firmware, hardware, or a combination thereof, to engage in NFC related transaction or wireless communication with the portable device 102.

As shown, the first coil antenna 104-2 or the second coil antenna 104-4 may each include a continuous a continuous loop of coil antenna that operates, for example, at about 13.56 MHz or any other frequency for the near field coupling communications. These coil antennas of the portable device 102 may be connected in series and are disposed in a manner to avoid presence of flux linkage/s between the two. For example, the first coil antenna 104-2 may be disposed on a display side and faces a user (not shown) while the second coil antenna 104-4 may be disposed at a corner or a back-side of the portable device 102. Other examples such as when the first and second coil antennas are at opposite corners of the portable device 102 may similarly apply.

In an implementation, an NFC module (not shown) may control these coil antennas 104-2 and 104-4 when communicating with the stylus 108. For example, when the processor has selected the particular frequency channel to be used for NFC communications between the stylus 108 and the portable device 102, the NFC module may control the coil antennas to resonate at that particular frequency channel. Although FIG. 1 shows a limited number of coil antennas (i.e., first and second coil antennas 104-2 and 104-4), additional multiple coil antennas may be configured or disposed at different other locations within the portable device 102.

The portable device 102 may include, but is not limited to, Ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

Figures 2A, 2B:
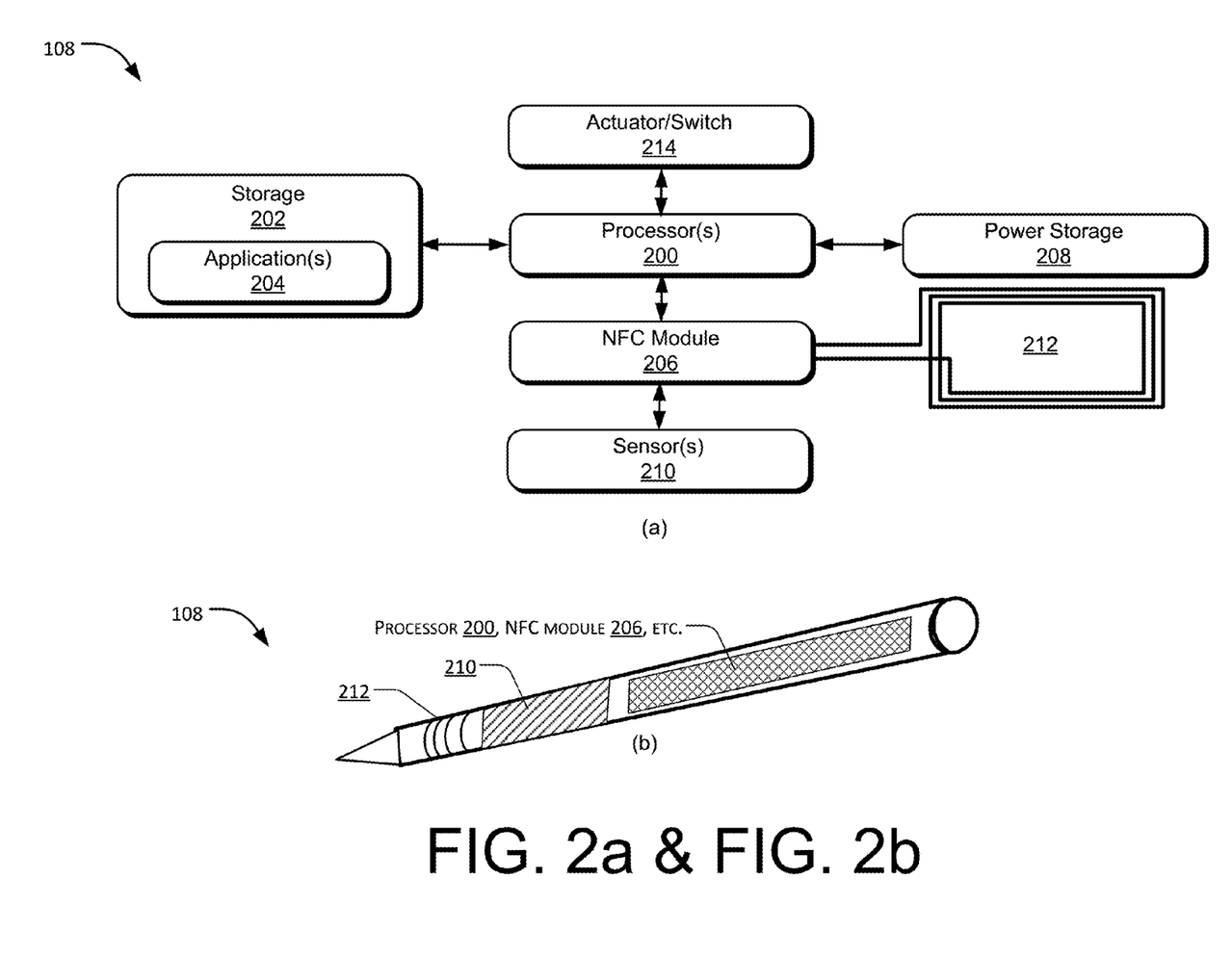
FIGS. 2*a* and 2*b* illustrate an example system of the stylus and a physical configuration-overview of the stylus, respectively, as described in implementations herein.

FIGS. 2a and 2b illustrate an example system and a physical configuration-overview of the stylus 108, respectively, as described in present implementations herein. As shown, the stylus 108 may be configured to be an independent wireless device by itself. That is, the stylus 108 may have its own processor(s) 200, a storage 202, and applications 204. The stylus 108 may further include an NFC module 206, an optional power storage 208, sensor 210, and a stylus coil antenna 212. Furthermore still, the stylus 108 may include an actuator or a switch 214 that may be utilized to select a present operation of the stylus 108.

For example, pressing the switch 214 once may activate the user-identification feature of the stylus 108. In this example, the sensor 210 may perform a function of scanning and reading user-fingerprints and the scanned user-fingerprint may be compared to stored fingerprints at the storage 202 to determine user identification and/or authorization. For identified and/or authorized users, the stylus 108 may be utilized to open and/or a particular document. Conversely, an already opened document may allow the stylus 108 to perform editing of the document after the user identification and/or authorization has been confirmed.

In another example, pressing the switch 214 twice may allow the stylus 108 to copy data from a screen (not shown) of the portable device 102 by using, for example, a copy-screen tab feature of the touch-sensor screen 106. In this example, the portable device 102 may utilize its NFC communication feature to transfer and store the requested data to the stylus 108. Thereafter, the stylus 108 may paste the data to another portable device (not shown) by using a pen frequency channel configured for the stylus 108, and/or through the same NFC communication mechanism as discussed above. In these two examples, the power storage 208 may continuously harvest charging signals from the magnetic fields generated by the first coil antenna 104-2 of the portable device 102.

In an implementation, the processor 200 may be configured to execute stored instructions or any of a number of applications 204 residing within the storage 202. In this implementation, the processor 200 is configured to control and coordinate the overall operations of the stylus 108. For example, to implement the user-identification feature of the stylus 108, the processor 200 may execute the application 204 that is specifically designed for user identification or user authorization. That is, upon activation of the user-identification feature using the switch 214, the processor 200 runs the application 204 that may direct the sensor 210 to perform fingerprint scanning and reading operations. In other implementations, the sensor 210 may be configured as another user interface (i.e., similar to the switch 214) for the stylus 108.

In another example, the processor 200 may run the software application 204 that offsets the hand-tremors on the part of the user. In this example, the processor 200 direct the sensor 210 to perform jitter-detection on the hands of the user and thereafter, an accelerometer (i.e., sensor) may be utilized by the processor 200 improve, for example, the identification of letters or markers that the user may want to write/input at the touch-sensor screen 106.

With continuing reference to FIG. 2a, the storage 202 may be a miniature memory of the stylus 108. For example, the storage 202 may include any form of random access memory (RAM), read-only memory (ROM), flash memory, or the like. In this example, the processor 200 may have direct access to the storage 202.

Coupled to the processor 200 is the NFC module 206 that may be utilized to control the stylus coil antenna 212. For example, the NFC module 206 may direct the stylus coil antenna 212 to operate at a particular frequency channel for touch communications. In this example, the particular frequency channel may be received from the portable device 102 to synchronize their operations. That is, a touch processor (not shown), for example, of the portable device 102 may be configured to select the particular frequency channel and communicates this selected frequency channel to the stylus 108 using the NFC communication channel. Thereafter, the stylus 108 and the main portable device 102 may engage in touch communications through the selected frequency channel. This operation may further save the power storage 208 from draining power because there is no need for the stylus 108 to continuously transmit multiple frequencies to transmit its location status, battery status, and the like.

The NFC module 206 may further include a transceiver circuitry that processes electrical signals (not shown) that may be received through the stylus coil antenna 212. For example, the NFC module 206 may facilitate tuning of the stylus coil antenna 212 for maximum power transfer during transmit or receive operations. In this implementation, the NFC module 206 may be integrated with the stylus coil antenna 212 and/or the processor 200 to form a single module.

In other implementations, the stylus 108 may be configured to receive data shown at the touch-sensor screen 106 every time that the switch 214 is pressed a number of times (e.g., twice). In this example, the portable device 102 may be pre-configured to send the screen data once it detects the request/control signal (i.e., pressing the switch twice) from the stylus 108 during NFC communications. In this other implementation, the stylus 108 may retrieve stored data as the need arises. For example, the stored data may be selected from the stylus 108 using a voice-to-text sensor. In this example, the selected data may be communicated back to the portable device 102 for display at the touch-sensor screen 106. The voice-to-text sensor, for example, includes a miniature display screen (not shown) for user's convenience.

In another implementation still, an NFC tag (not shown) may be integrated to the power storage 208. The NFC tag, for example, may transmit stylus identification to the portable device 102. In this example, the NFC tag may perform the transmission once the stylus 108 is within the magnetic field-coverage area of the first coil antenna 104-2 and the stylus 108 is powered ON.

With continuing reference to FIG. 2b, the stylus coil antenna 212 is shown to include a continuous loop of coil antenna that is disposed at front end of the stylus 108. The sensor 210 such as a fingerprint sensor, may be positioned adjacent to the stylus coil antenna 212. Furthermore, the rest of the components as discussed in FIG. 2a above may be located at the circuitry along the main body of the stylus 108. In another implementation, the stylus coil antenna 212 may be disposed at back-end or along outer surface of the pen body.

Figure 3:
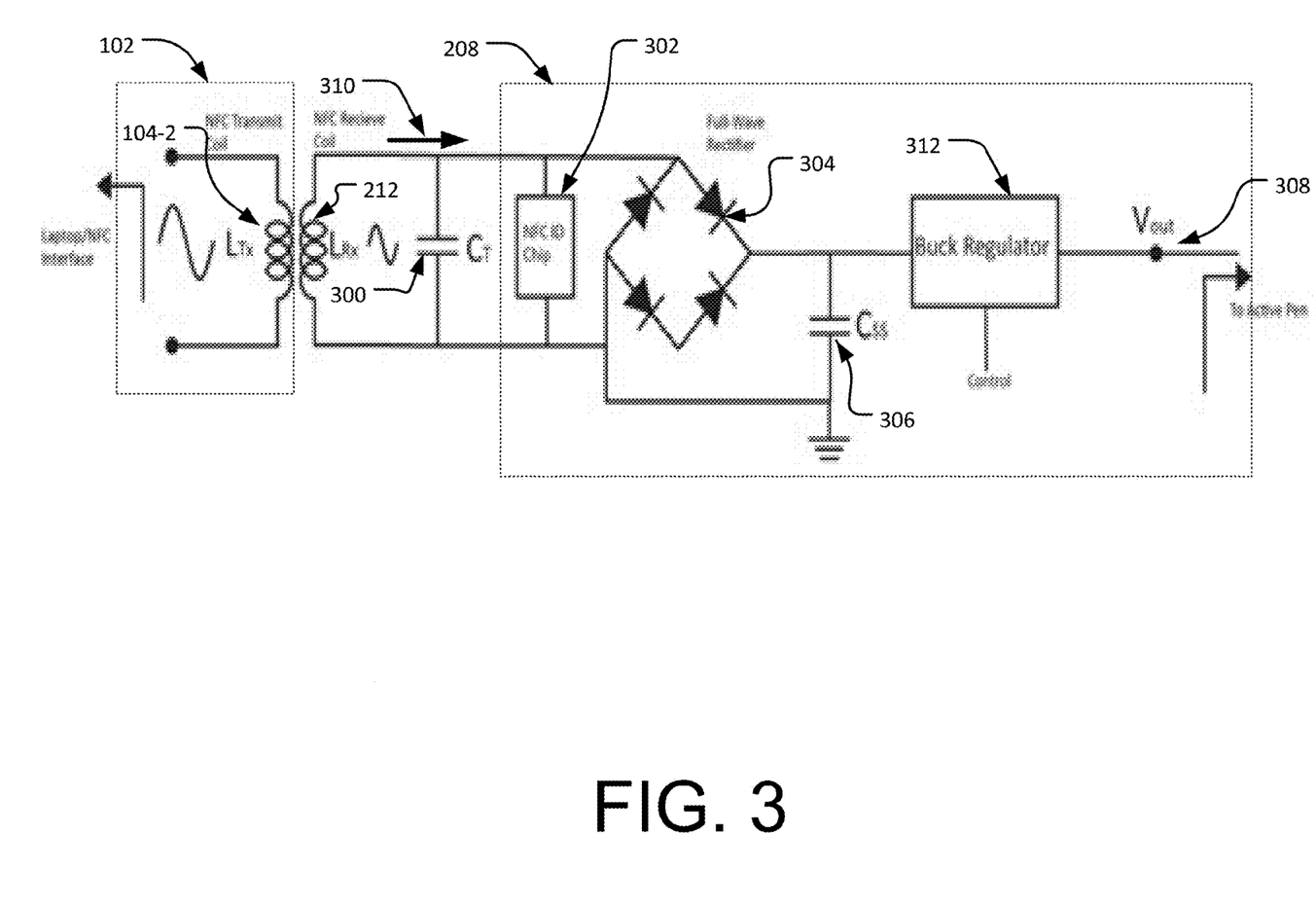
FIG. 3 is an example NFC-power charging arrangement between a power storage of the stylus and a first coil antenna of the portable device as described in present implementations herein.

FIG. 3 illustrates an example NFC-power charging arrangement between the power storage 208 and the first coil antenna 104-2. Although the power storage 208 as described herein may store harvested charging power from the first coil antenna 104-2, the power storage 208 need not store the charging power, because they are continuously converted and used for present operations of the stylus 108.

As described in present implementations herein, the NFC-power charging arrangement includes the first coil antenna 104-2 of the portable device 102, the stylus coil antenna 212 together with a coil tuning capacitor 300, and the power storage 208 of the stylus 108. The power storage 208 may further include a NFC tag 302, a full-wave rectifier 304, a storing capacitor 306, and an output voltage supply 308 that supplies power to the stylus 108.

When the stylus coil antenna 212 is aligned and directed within the coverage area, for example, of the first coil antenna 104-2, the principle of mutual induction may induce a current 310 to the portable storage 208. The induced current 310 is rectified by the full-wave rectifier 304 and the resulting DC voltage may be used to charge the storing capacitor 306. A regulator 312 may then be configured to supply the output voltage supply 308.

Similarly, the principle of mutual induction may facilitate the activation of the stylus 108. At this instance, the NFC tag 302 may modulate the operating frequency of the first coil antenna 104-2 to transmit, for example, the identification of the stylus 108. In another example, the switch 214 of the stylus 208 may be utilized to activate the NFC tag 302. That is, the NFC tag 302 may use the present NFC communications between the first coil antenna 104-2 and the stylus coil antenna 212 to transmit the stylus tag or identification.

Figure 4:
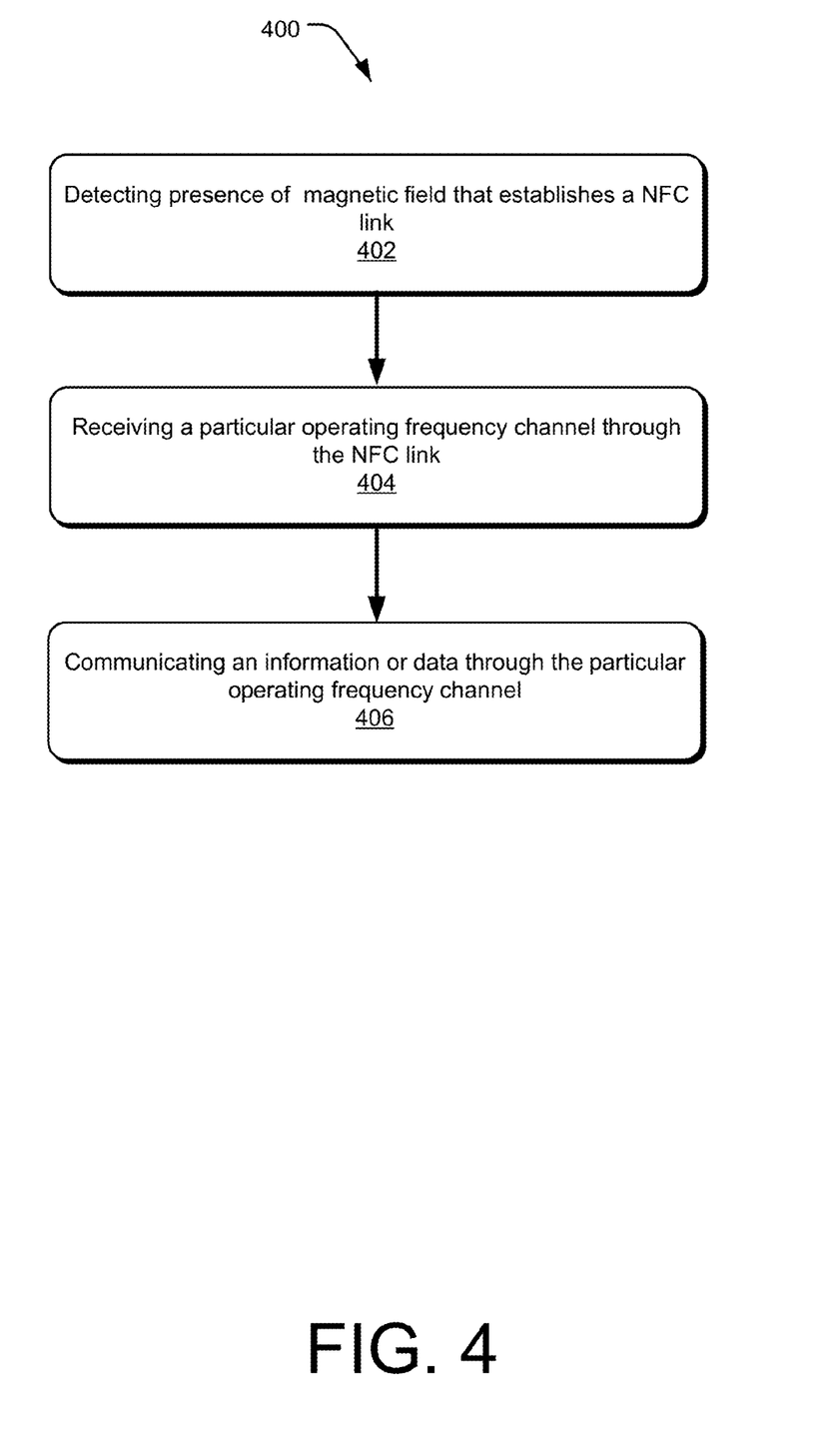
FIG. 4 is an example process chart illustrating an example method for NFC-based operations as implemented at a stylus side.

FIG. 4 shows an example process chart 400 illustrating an example method for implementing NFC-based active stylus as implemented at the stylus device side. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, detecting presence of a magnetic field by a stylus coil antenna is performed. For example, when the stylus 108 is within certain distance from a surface of the touch-sensor screen 106, a principle of mutual induction between the first coil antenna 104-2 and the stylus coil antenna 212 may be utilized to detect presence of the magnetic field from the portable device 102. This detection may be utilized to turn ON the stylus 108. In this example, the magnetic field from the first coil antenna 104-2 may be utilized to charge the battery and/or the capacitor 306 of the stylus 108. In another example, when the tip of the stylus 108 touches the surface of the touch-sensor screen 108, the portable device 102 may send a control signal to turn ON the stylus 108.

At block 404, receiving of a particular operating frequency channel is performed. For example, upon turning ON of the stylus 108, the stylus 108 is configured to receive the particular operating frequency channel to transmit information or data. The information or data may include user identification, user authorization, stylus location, stylus battery capacity, and the like. In this example, the particular operating frequency channel may be selected by the portable device 102. That is, the portable device 102 may select the operating frequency channel based on security purposes and/or to avoid channel interferences.

At block 406, communicating information or data by the stylus is performed. For example, when the stylus 108 is set to the particular operating frequency, the stylus may send the information or data to the portable device 102 as described above. In this example, the use or operation of the stylus 108 over the touch-sensor screen 106 may run in parallel with the NFC communications between the stylus 108 and the portable device 102.

Figure 5:
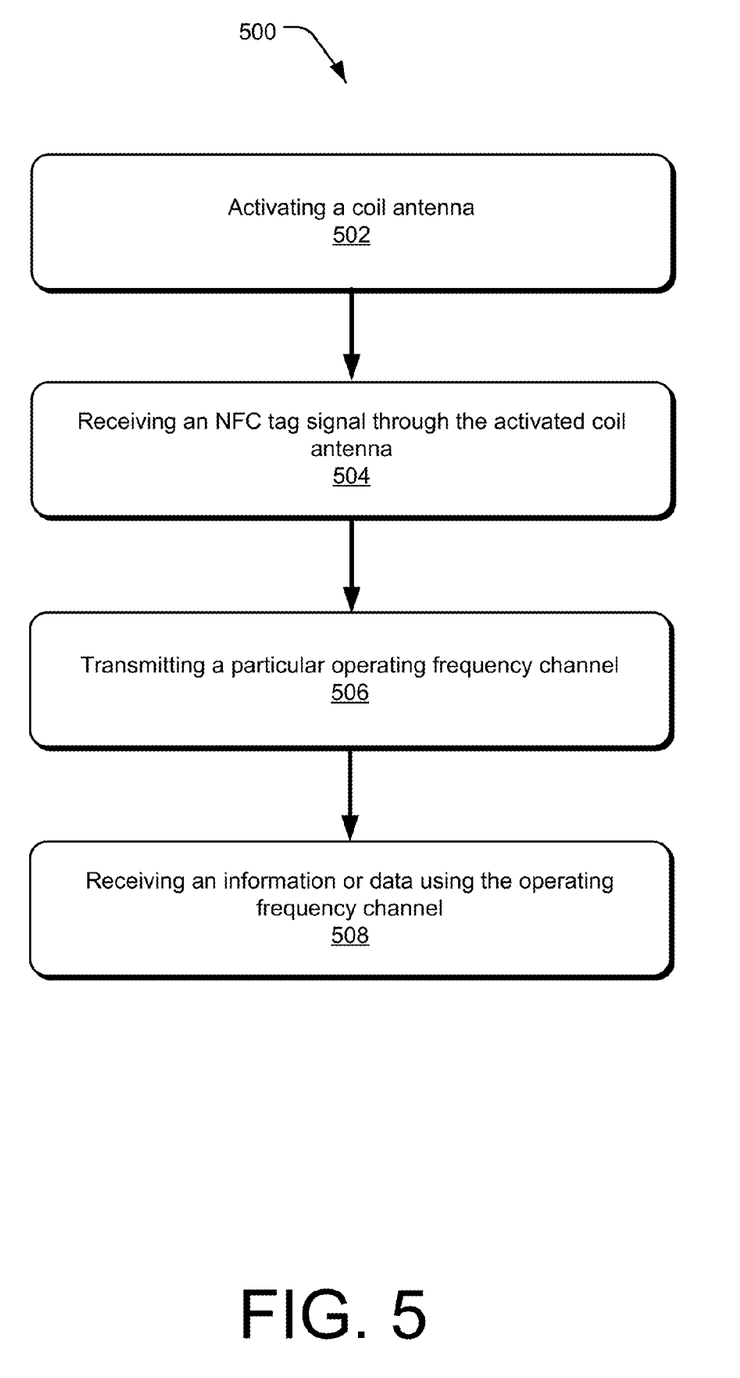
FIG. 5 is an example process chart illustrating an example method for NFC-based operations as implemented at a portable device side.

FIG. 5 shows an example process chart 500 illustrating an example method for implementing NFC-based active stylus as implemented at the portable device side. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, activating a coil antenna to radiate a magnetic field is performed. For example, turning ON the portable device 102 may facilitate radiation of a magnetic field in the first coil antenna 104-2. In this example, the magnetic field may create mutual induction with another coil antenna such as the stylus coil antenna 212 as discussed above.

At block 504, receiving an NFC tag signal through the coil antenna is performed. For example, the NFC tag 306 includes the identification of the stylus 108 that is aligned or directed within coverage area of the firsts coil antenna 104-2. In this example, the portable device 102 through the first coil antenna 104-2 may receive the NFC tag to verify the identity of the pairing stylus 108.

At block 506, transmitting a particular operating frequency channel through the coil antenna is performed. For example, the portable device 102 includes a processor that is configured to select the particular operating frequency channel for security reasons and/or lower interference purposes. In this example, the selected particular operating frequency channel is transmitted through the first coil antenna 104-2 by the portable device 102. The selected particular operating frequency channel may save the power storage at the stylus 108 from draining quickly as there is no need for the stylus to continuously transmit multiple frequencies.

At block 508, receiving information or data using the particular operating frequency channel is performed. For example, the stylus 108 transmits a request signal to the portable device 102 to transmit a particular information or data as presently shown at the touch-sensor screen 106. In this example, the portable device 102 may communicate the file/files as requested to the stylus 108 for storing.

The following examples pertain to further embodiments:

Example 1 is a device comprising: a coil antenna configured to detect presence of a magnetic field, wherein the magnetic field facilitates one or more of the following: switching ON, power charging, and establishing of a near field communication (NFC) link in the device; a NFC module configured to process a signal received through the stylus coil antenna, wherein the received signal includes a particular frequency channel for the NFC link; a processor coupled to the NFC module, configured to run a plurality of applications to control an operation of the device, the operation comprises transmitting an information or data using the particular frequency channel; and a user interface coupled to the processor, configured to select an operation that corresponds to the plurality of applications.

In Example 2, the device as recited in Example 1, wherein the coil antenna is a stylus antenna.

In Example 3, the device as recited in Example 1, wherein the NFC modules utilizes the particular frequency channel to send the information or data through the coil antenna, the information or data comprises at least one of a user-fingerprint, a user identification or authorization, or a stylus-status information.

In Example 4, the device as recited in Example 3 further comprising a sensor configured to perform a function based on the selected operation, the function includes scanning and reading of the user-fingerprint, wherein the user-fingerprint is compared with stored fingerprints to determine the user identification or authorization.

In Example 5, the device as recited in Example 1, wherein the operation comprises transmitting of a signal request to receive a copy of a data shown at a screen of another device.

In Example 6, the device as recited in Example 1 further comprising a storage that stores the plurality of applications.

In Example 7, the device as recited in Example 1 comprising a NFC tag configured to include a unique identification that is transmitted through the coil antenna to identify the device.

In Example 8, the device as recited in Example 1 further comprising a power storage that comprises a full-wave rectifier and a storing capacitor to receive and store the charging power.

In Example 9, the device as recited in Examples 1 to 8, wherein the user interface is a switch or a sensor.

In Example 10, the device as recited in Examples 1 to 8, wherein the coil antenna is disposed at a front-end, back-end, or along outer body-surface of the device.

Example 11 is an apparatus comprising: a coil antenna configured to receive a magnetic field that induces a charging current; a power storage configured to receive the charging current; a NFC module configured to process a signal that is received through the coil antenna, wherein the received signal includes a particular frequency channel for a near field communications (NFC) link; and a processor coupled to the NFC module, the processor configured to run a plurality of applications to control an operation of the device, the operation comprises transmitting an information or data using the particular frequency channel.

In Example 12, the apparatus as recited in Example 11, wherein the coil antenna is a stylus antenna.

In Example 13, the apparatus as recited in Example 11, wherein the NFC module is configured to utilize the particular frequency channel to send the information or data through the coil antenna, the information or data includes a user-fingerprint, a user identification or authorization, or a stylus-status information.

In Example 14, the apparatus as recited in Example 11 further comprising a switch coupled to the processor, configured to facilitate selection of operations that correspond to the plurality of applications.

In Example 15, the apparatus as recited in Example 14 further comprising a sensor configured to perform a function based on the selected operation, the function comprises scanning and reading of the user-fingerprint, detecting a hand-jitter, or to act as an accelerometer.

In Example 16, the apparatus as recited in any of Examples 11 to 15 further comprising a NFC tag that comprises a unique identification configured to be transmitted through the stylus coil antenna to identify the apparatus.

Example 17 is a method of near field communications (NFC)-based operation in a stylus device, the method comprising: detecting presence of a magnetic field that establishes a NFC link; receiving of a particular operating frequency channel through the NFC link; and communicating an information or data through the NFC link.

In Example 18, the method as recited in Example 17, wherein the particular frequency channel is selected based on a determined user identification or authorization.

In Example 19, the method as recited in Example 17 further comprising running one or more applications for the communicating of the information or data through the NFC link.

In Example 20, the method as recited in Example 17 further comprising transmitting of an NFC tag to identify the stylus device.

In Example 21, the method as recited in Example 17 further comprising transmitting of a signal request to receive a copy of a data shown at a screen of another device.

In Example 22, the method as recited in any of Example 1717 to 21, wherein the detected magnetic field induces a current that charges the stylus device.

What is claimed is:

1. A stylus device comprising:
    a coil antenna configured to detect presence of a magnetic field from another device, wherein the magnetic field facilitates: switching ON, power charging, and establishing of a near field communication (NFC) link with the other device;
    a NFC module configured to process a signal received through the established NFC link, wherein the received signal includes a particular frequency channel that is utilized to receive a displayed data during a touch-communication with the other device, the NFC module directs the coil antenna to operate at the particular frequency channel for touch-communications, wherein the touch communication operates in parallel with NFC communications between the stylus device and the other device;
    a processor coupled to the NFC module, configured to run a plurality of applications to control an operation of the stylus device; and
    a user interface coupled to the processor, configured to select the operation that correspond to the plurality of applications.

2. The stylus device as recited in claim 1, wherein the coil antenna is a stylus antenna.

3. The stylus device as recited in claim 1, wherein the NFC modules utilizes the established NFC link to send an information or data through the coil antenna, the information or data comprises at least one of a user-fingerprint, the user identification or authorization, or a stylus-status information.

4. The stylus device as recited in claim 3, further comprising a sensor configured to perform a function based on the selected operation, the function includes scanning and reading of the user-fingerprint, wherein the user-fingerprint is compared with stored fingerprints to determine the user identification or authorization.

5. The stylus device as recited in claim 1, wherein the user interface is a switch or a sensor.

6. The stylus device as recited in claim 1, wherein the operation comprises transmitting of a signal request to receive a copy of the touch-screen data shown at a screen of the other device.

7. The stylus device as recited in claim 1, wherein the coil antenna is disposed at a front-end, back-end, or along outer body-surface of the stylus device.

8. The stylus device as recited in claim 1 further comprising a storage that stores the plurality of applications.

9. The stylus device as recited in claim 1 further comprising a NFC tag configured to include a unique identification that is transmitted through the coil antenna to identify the stylus device.

10. The stylus device as recited in claim 1 further comprising a power storage that comprises a full-wave rectifier and a storing capacitor to receive and store the charging power.

11. An apparatus comprising:
    a coil antenna configured to facilitate a near field communications (NFC) link with another device;
    a power storage configured to receive a charging current through the NFC link;
    a NFC module configured to process a signal that is received through the NFC link, wherein the received signal includes a particular frequency channel that is utilized to receive a displayed data during a touch-communication with the other device, the NFC module directs the coil antenna to operate at the particular frequency channel for touch communications, wherein the touch communication operates in parallel with NFC communications between the apparatus and the other device; and
    a processor coupled to the NFC module, the processor configured to run a plurality of applications to control an operation of the apparatus.

12. The apparatus as recited in claim 11, wherein the coil antenna is a stylus antenna.

13. The apparatus as recited in claim 11, wherein the NFC module is configured to utilize the established NFC link to send an information or data through the coil antenna, the information or data includes a user-fingerprint, the user identification or authorization, or a stylus- status information.

14. The apparatus as recited in claim 10 further comprising a switch coupled to the processor, configured to facilitate selection of operations that correspond to the plurality of applications.

15. The apparatus as recited in claim 14, further comprising a sensor configured to perform a function based on the selected operation, the function comprises scanning and reading of the user-fingerprint, detecting a hand-jitter, or to act as an accelerometer.

16. The apparatus as recited in claim 10 further comprising a NFC tag that comprises a unique identification configured to be transmitted through the coil antenna to identify the apparatus.

17. A method of near field communications (NFC)-based operation in a stylus device, the method comprising:
    detecting presence of a magnetic field that establishes a NFC link with another device;
    determining a user identification or authorization;
    receiving of a particular operating frequency channel through the NFC link, wherein the particular operating frequency channel is utilized to receive a displayed data during a touch-communication with the other device;
    operating at the particular frequency channel for touch-communications; and
    operating the touch-communication in parallel with NFC communications between the stylus device and the other device.

18. The method as recited in claim 17, wherein the detected magnetic field induces a current that charges the stylus device.

19. The method as recited in claim 17, wherein the particular operating frequency channel is selected based on security purposes and to avoid channel interferences.

20. The method as recited in claim 17 further comprising running one or more applications for the communicating of the information or data through the NFC link.

21. The method as recited in claim 17 further comprising transmitting of an NFC tag to identify the stylus device.

22. The method as recited in claim 17 further comprising transmitting of a signal request to receive a copy of the touch-screen data shown at a screen of the other device.

* * * * *